United States Patent Office 3,232,660
Patented Feb. 1, 1966

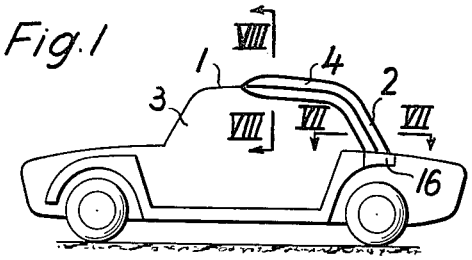
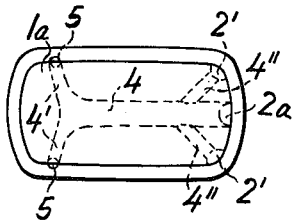
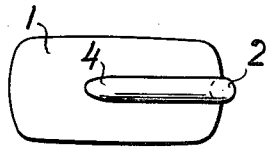
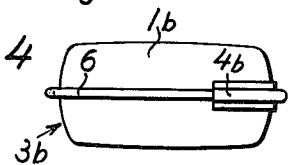
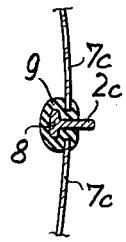
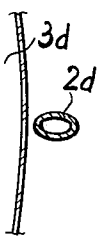
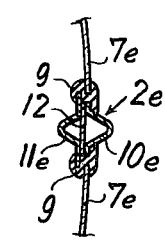
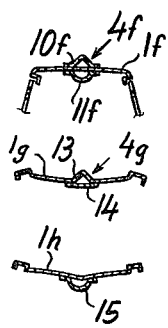
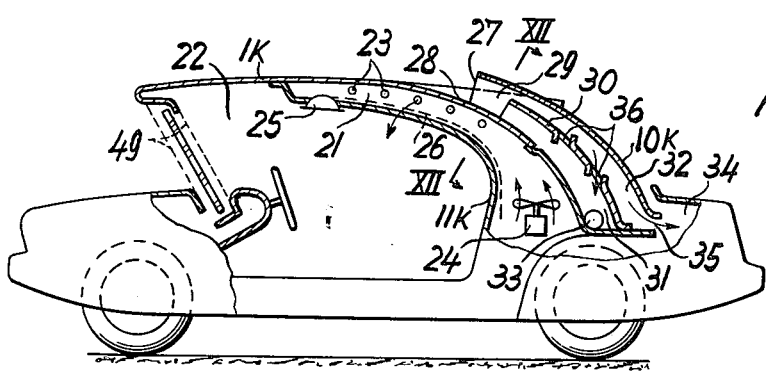
INVENTOR
BELA BARENYI

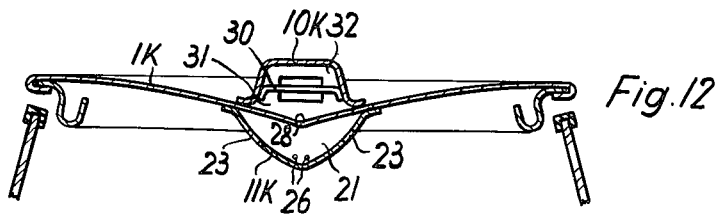
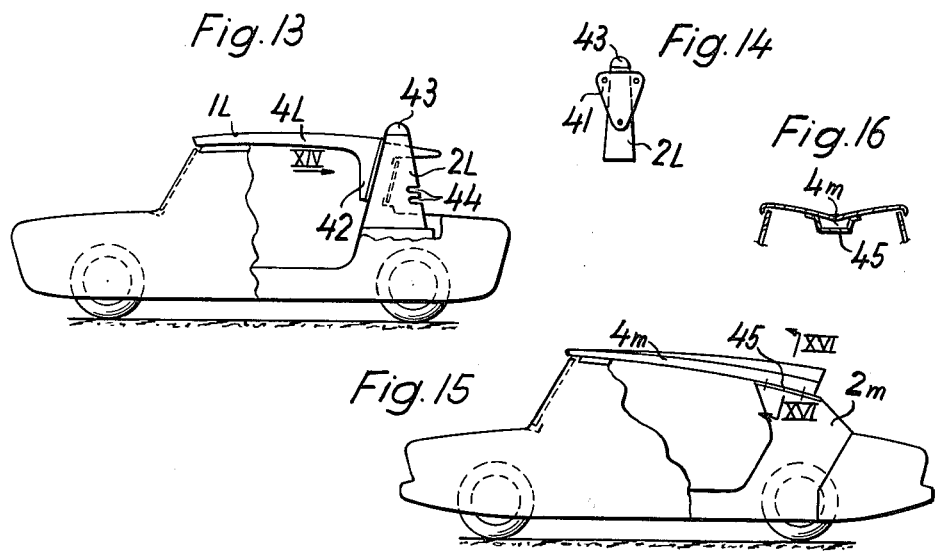
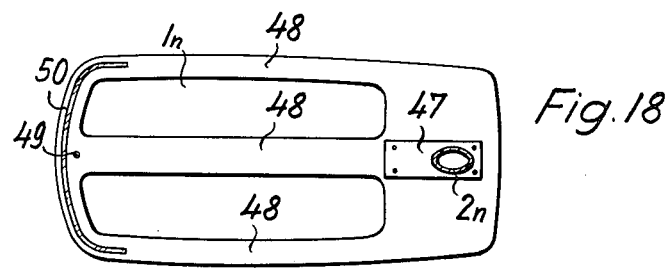

3,232,660
BODY STRUCTURE OF MOTOR VEHICLES
Béla Barényi, Stuttgart-Vaihingen, Germany, assignor to Daimler-Benz Aktiengesellschaft, Stuttgart-Unterturkheim, Germany
Filed May 27, 1963, Ser. No. 283,285
Claims priority, application Germany, May 29, 1962, D 39,032
8 Claims. (Cl. 296—28)

The present invention relates to the body structure of motor vehicles, and especially of passenger cars, in which the top of the body is supported substantially by a single main supporting member of a narrow width.

In prior body structures of this type, the top of the body is supported by a post near the center of gravity of the top, that is, substantially at the center thereof. Such a location of the supporting post has the great disadvantage that it obstructs the inside of the vehicle and interferes with the range of vision of the car's passengers and especially of the driver toward the rear, this interference being the more serious the closer such a center post is located in the driver's seat. In some prior vehicles the center post forms a part of a frame which extends vertically within the central longitudinal plane of the vehicle and also very seriously obstructs the view from the vehicle.

It is an object of the present invention to provide a support for the top of the vehicle which permits the best possible view from the inside of the car in all directions and also permits the car body to be constructed very easily and inexpensively and in a manner so that not only the top but the entire body as well will be of the greatest possible stability.

A further object of the invention is to design the top-supporting element so that it will also serve for ventilating either the inside of the vehicle or the engine compartment or both and, if desired, also for draining water from the top of the vehicle, especially if it is concave or provided with one or more recesses in its upper side.

These and other objects of the invention are attained by providing in place of an inner post or the like a main supporting member which projects upwardly from the rear end of the vehicle body within the central longitudinal plane thereof and is preferably very narrow in the transverse direction of the vehicle. For reinforcing the top, this main supporting member may be continued by a central top support which, if desired, may extend up to the front edge of the top. The main supporting member or the top support or both may be integral with each other or removably secured to each other, and they may extend either along the inside or the outside of the contours of the car body or along both the inside and outside.

Another feature of the invention consists in making the main supporting member or the top support or both of a hollow structure for the purpose of supplying air to the passenger compartment or the engine compartment or for venting the same, for draining water from the top of the vehicle, or for the installation of cables, rods, or pipe lines. According to a preferred embodiment of the invention, a part of the main strut and top support which is located at the inner side of the contour of the top may be utilized as a channel for ventilating purposes, for the installation of inside lights, or for mounting supporting handles or the like thereon, while another part of the main strut and top support which is located at the outer side of the contour of the top may be used for ventilating or cooling purposes, for draining water from the top of the vehicle, or for supplying air to or discharging the exhaust gases from the engine. The hollow space within the main strut or the top support or both may then be provided with partitions so as to form several channels.

The various features and advantages of the present invention will become more clearly apparent from the following detailed description thereof which is to be read with reference to the accompanying diagrammatic drawings, in which—

FIGURE 1 shows a diagrammatic longitudinal section of a passenger car according to the invention;

FIGURE 2 shows a plan view of the top of the car according to FIGURE 1;

FIGURE 3 shows a plan view of a car top which is similar to that according to FIGURE 2, but provided with an internal top support which is bifurcated near the front end of the top;

FIGURE 4 shows a plan view of a car top which is similar to that according to FIGURE 2 but provided with a bracketlike extension of the top support;

FIGURE 5 shows a cross section which is similar to that according to FIGURE 7 and is taken along line VII—VII of FIGURE 1;

FIGURE 6 shows a cross section which is also taken along line VII—VII of FIGURE 1, but shows a modification of the main strut located outside of the rear contour of the car;

FIGURE 7 shows a cross section of the car according to FIGURE 1, taken along line VII—VII thereof;

FIGURE 8 shows a cross section which is taken along line VIII—VIII of FGURE 1;

FIGURE 9 shows a cross scetion similar to that according to FIGURE 8, but with a modification of the top support which is partly formed by the car top itself;

FIGURE 10 shows a cross section similar to that according to FIGURE 8, but with a further modification of the top support which is located at the inside of the actual car top;

FIGURE 11 shows a longitudinal section of a further modification of a car according to the invention;

FIGURE 12 shows a cross section which is taken along line XII—XII of FIGURE 11;

FIGURE 13 shows a diagrammatic longitudinal section of a further modification of a car according to the invention;

FIGURE 14 shows a front view of the connecting surface for the top support, as seen in the direction of the arrow XIV in FIGURE 13;

FIGURE 15 shows a diagrammatic longitudinal section of a further modification of a car according to the invention;

FIGURE 16 shows a cross section which is taken along line XVI—XVI of FIGURE 15;

FIGURE 17 shows a diagrammatic longitudinal section of a small omnibus according to the invention; while FIGURE 18 shows a section which is taken along line XVIII—XVIII of FIGURE 17.

According to the first embodiment of the invention, as illustrated in FIGURES 1 and 2, the top 1 of the car is supported solely by a curved beam 2 which extends centrally of the rear wall of the passenger compartment and along the top of the car where it is continued in the form of a top support 4 which extends to a point slightly beyond the center of the length of the top 1. This main beam 2, 4 extends partly at the inside and partly at the outside of the contour of the upper part 3 of the car body. It may, however, also extend entirely at the inside, as indicated in dotted lines in FIGURE 3. Especially in the latter case, its front end may be bifurcated and the two arms 4' thus formed may be secured to and supported by very thin door posts 5. In place of this bifurcated front end of the beam, the top 1a of the car may be reinforced by a transverse strut which is connected to the thin door posts and centrally to the straight end of the beam.

FIGURE 3 also indicates in dotted lines that the rear part of the beam 2a may also be bifurcated at 4″ either in addition to or in place of the central rear part 2a. The beams 2′ which are secured to the arms 4″ may, even when replacing the central rear part 2, be made of a smaller cross section than the latter. If only the lateral beams 2′ are provided the car may be provided with a large unobstructed rear window and, if desired, the beams 2′ may also serve as the outer frame members of this window.

In the car according to FIGURE 4, the top 1b is largely self-supporting since the top supporting part 4b of the beam which engages upon the outside of the top is relatively short. As a protection and reinforcement of the top 1b a bracket 6 which is spaced from the upper surface of top 1b is secured to the front end of the beam and extends along a curvature to the lower edge of the upper body 3b where it may be secured, for example, to a transverse strut of the vehicle. Such a bracket could also be directly connected to the upper end of a post which projects above the top.

The main supporting beam may be of various shapes and constructions. Thus, for example, as shown in FIGURE 5, the beam 2c may be a T-shaped cross section which has the advantage that it may also serve as a part of the frame of the two rear windows 7c. The inner transverse web 8 especially of the lower part 2c of the beam may then serve as the support of a sealing strip 9 for the window panes 7c. This sealing strip may also cover the beam at least toward the inside of the car and may be made in the form of a decorative molding.

As illustrated in FIGURE 6 the lower part 2d of the beam may also be mounted entirely outside of the upper part 3d of the car body so that the rear window does not have to be divided. In order to attain a beam of the greatest possible strength which interferes as little as possible with the range of vision from the inside of the car, beam 2d may be made, for example, of a hollow oval cross section, the larger transverse axis of which extends in the longitudinal direction of the car. Of course, the upper part of the beam which is secured to the top of the car may then also be made of a hollow or tubular cross section.

FIGURE 7 shows an enlarged cross section of the beam part 2 as illustrated in FIGURE 1. It consists of two half shells 10e and 11e one of which is substantially located at the outside and the other at the inside of the contour of the car body. Both half shells are provided with longitudinal flanges for connecting them to each other and preferably to an intermediate partition 12. These flanges also serve for the same purpose as the transverse web 8 in FIGURE 5, namely, as a part of the frames for the rear windows 7e and as supports for the sealing strips 9 for these windows. FIGURE 8 shows a cross section of the upper, top-supporting part 4f of the beam according to FIGURE 1. The two half shells 10f and 11f are secured to the upper and lower sides of the top 1f which thus replaces the partition 12 of the lower part 2e of the beam, as shown in FIGURE 7.

FIGURES 9 and 10 illustrate modifications of the shape of the upper, top-supporting part 4g of the beam. In FIGURE 9, the top 1g of the car is slightly concave and a central longitudinal corrugation or rib 13 is presssed into it so as to project upwardly. The lower concave side of this rib is closed toward the inside of the car by a flat cover plate 14. In this case, the top 1g therefore itself serves as a part of the supporting beam. The top 1h according to FIGURE 10 is of a wing-shaped cross section and the supporting beam consists of a half shell 15 which is secured to the inner side of the top.

While according to the embodiment as shown in FIGURES 1 and 7, beam 2 or 2e is secured at its lower end to an upper transverse crossbar 16 of the vehicle, the inner half shell 11k of the beam according to FIGURES 11 and 12 is integral with the main frame of the car. Together with the top 1k and the partition which is secured to the rear end of the top, the inner half shell 11k encloses a channel 21 which serves as an air channel for the ventilation of the interior 22 of the car. The half shell 11k is for this purpose provided with ventilating holes 23 like those of an air shower. If desired, some or all of these ventilating holes 23 may be partly or fully closed by suitable means, such as slides, flaps, or the like. Within the air channel 21, which preferably communicates at the base of the beam with the outer air or with the engine compartment of the car, one or more heat exchangers, fans, distributing flaps, or the like may be provided, as indicated in FIGURE 11, for example, by the fan 24.

Near its front end, the half shell 11k also carries a dome light 25, the connecting lines 26 of which extend along the inside of channel 21. The inner half shell of the beam may also serve as a support of handles or any other accessories of the car. Channel 21 may also contain other electric lines, pipes, or rods which might be required for the operation of the car.

The outer half shell 19k of the top supporting beam of the car according to FIGURES 11 and 12 is shorter than the inner half shell 11k and open at its front end. This opening 27 serves as an inlet for air and water into the main channel which is enclosed by the half shell 10k and the top 1k. This is of advantage especially in view of the wing-shaped cross section of the top 1 since the rain water collecting in the central trough 28 of the top can then be drained off at one point. In order to prevent water particles from being taken along by the air current entering the opening 27 and from passing with this air current, for example, into the engine compartment 34, the channel which is formed by the half shell 10k and the top 1k including its rear extension is divided by a baffle plate 30 into two channels 31 and 32. The rain water coming from the top of the car then flows through the lower channel 31 and to the outside through the opening 33 at the lowest point of this channel, while the current of fresh air entering through the opening 27 is split up and only the part which flows through the upper channel 32 passes to the engine compartment 34 through the opening 35. Any rain drops which might possibly be taken along into the channel 32 will separate from the air current on the walls of this channel and flow off into the water channel 31 through apertures 36 in the baffle plate 30. Of course, additional filter means may also be provided in the air channel 32.

While in all of the embodiments of the invention as previously described the lower part of the beam is integral with the upper top-supporting part thereof, this upper part 4L of the car as shown in FIGURES 13 and 14 is separate from the lower part 2L and removably secured thereto. Beam 2L is for this purpose provided with an almost vertical flange 41 to which a bracketlike part 42 of the top support may be connected. The end of beam 2L which projects above the upper surface of top 1L is provided with a signal or warning lamp 43. Furthermore, the rear side of the hollow beam 2L is provided with openings 44 for discharging the exhaust gases of the engine.

Another car according to the invention in which the top support 4m is removably secured to the beam 2m is illustrated in FIGURES 15 and 16. In this case, however, the two parts are connected to each other at the upper end of the beam and the connecting surface extends within a plane which is only slightly inclined to a horizontal plane.

FIGURES 17 and 18 finally illustrate the invention as applied to a small omnibus. The top 1n of the bus is connected directly to an enlarged flange 47 on the upper end of the single rear beam 2n which has an oval hollow cross section. The connecting surface 46 between beam 2n and top 1n extends similarly as in the car according to FIGURES 15 and 16 within a substantially horizontal plane. In order to make the relatively large top 1n of the required rigidity, its central and outer parts 48 are reinforced. The top 1n is further connected at its front end by a strut 49 or a cable or the like to a lower fixed part of the vehicle so as to engage upon the windshield 50. Such a strut 49 is also provided on the car according to FIGURE 11.

Although my invention has been described and illustrated with reference to the preferred embodiments thereof, I wish to have it understood that it is in no way limited to the details of such embodiments, but is capable of numerous modifications within the scope of the appended claims.

Having thus fully disclosed my invention, what I claim is:

1. A motor vehicle having an upper body and a top thereon, said top having a central longitudinal reinforcing corrugation extending along at least a part of the length of said top, a striplike member secured to said top and covering the concave side of said corrugation so as to form a longitudinal channel between said top and said striplike member, and a single beamlike supporting member secured to the rear end of said upper body within the central longitudinal plane of said vehicle and secured to said top and forming the main support thereof.

2. A motor vehicle, especially a passenger motor vehicle, having an upper body and a top thereon supported by a single supporting beam extending lengthwise along the longitudinal central plane of said vehicle, the dimension of said beam in the transverse direction of the vehicle being very short compared to the length of said beam, said beam being supported by the frame of said vehicle in the region of the rear portion of the vehicle superstructure, said supporting beam further comprising a hollow member extending lengthwise of said length of said beam and disposed on the outer surface of said top, said supporting beam and said hollow member being in the form of tubular half shells having cross-sections extending in directions of their heights in mutually opposite directions.

3. A motor vehicle as defined in claim 2, in which the lower end of said supporting beam is secured to said frame, an upwardly extending part of said beam adjacent to said lower end being spaced from the rear end of said upper body.

4. A motor vehicle as defined in claim 2, in which said hollow member has a substantially U-shaped cross section.

5. A motor vehicle as defined in claim 2, in which said tubular half shell forming said supporting beam defines at least one channel and at least one element for the operation of said vehicle beam mounted within said channel.

6. A motor vehicle as defined in claim 2, in which said tubular half shell forming said supporting beam defines at least one channel having openings communicating with the inside and outside of at least one compartment of said vehicle for ventilating said compartment.

7. A motor vehicle as defined in claim 2, in which said tubular half shell forming said supporting beam is provided with openings communicating with the engine of said vehicle and with the outside for discharging the exhaust gases of said engine.

8. A motor vehicle as defined in claim 2, in which said tubular half shell forming said supporting beam is provided with openings communicating at least with the outside at the top of said vehicle and at a lower point of said vehicle for at least draining rain water from said top.

References Cited by the Examiner

UNITED STATES PATENTS

| D. 176,962 | 2/1956 | Macauley. | |
|---|---|---|---|
| 1,483,290 | 2/1924 | Eggiman. | |
| 1,543,877 | 6/1925 | Saunders. | |
| 2,523,104 | 9/1950 | Emmert. | |
| 2,626,180 | 1/1953 | Thompson | 296—28 |
| 2,645,521 | 7/1953 | Judson. | |
| 2,842,394 | 7/1958 | MacPherson | 296—28 |
| 3,027,186 | 3/1962 | Charipar | 296—28 |

FOREIGN PATENTS

| 869,822 | 11/1941 | France. |
|---|---|---|
| 856,102 | 11/1952 | Germany. |
| 507,796 | 6/1939 | Great Britain. |
| 522,051 | 6/1940 | Great Britain. |

BENJAMIN HERSH, *Primary Examiner.*

A. HARRY LEVY, *Examiner.*